(12) United States Patent
Bayer et al.

(10) Patent No.: US 11,619,285 B2
(45) Date of Patent: Apr. 4, 2023

(54) COAXIAL GEAR MECHANISM

(71) Applicant: WITTENSTEIN SE, Igersheim (DE)

(72) Inventors: Thomas Bayer, Igersheim (DE);
Michael Schmidt, Reichenberg (DE);
Andreas Kuemmeth, Ochsenfurt (DE);
Thomas Rossmeißl, Künzelsau (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 17/495,151

(22) Filed: Oct. 6, 2021

(65) Prior Publication Data

US 2022/0107003 A1    Apr. 7, 2022

(30) Foreign Application Priority Data

Oct. 6, 2020   (DE) .......................... 102020126114.4

(51) Int. Cl.
| | | |
|---|---|---|
| *F16H 1/24* | (2006.01) | |
| *F16H 25/04* | (2006.01) | |
| *F16C 33/58* | (2006.01) | |
| *F16C 19/14* | (2006.01) | |
| *F16H 57/12* | (2006.01) | |
| *F16H 49/00* | (2006.01) | |
| *F16H 25/06* | (2006.01) | |
| *F16C 19/16* | (2006.01) | |

(52) U.S. Cl.
CPC .............. *F16H 1/24* (2013.01); *F16H 25/06* (2013.01); *F16H 49/00* (2013.01); *F16H 57/12* (2013.01); *F16C 19/163* (2013.01); *F16C 33/581* (2013.01); *F16C 2361/61* (2013.01)

(58) Field of Classification Search
CPC .......... F16H 1/24; F16H 1/2863; F16H 25/06; F16H 49/00; F16H 53/00; F16H 57/12; F16C 19/163; F16C 33/581; F16C 2361/61
See application file for complete search history.

(56) References Cited

U.S. PATENT DOCUMENTS

| | | | |
|---|---|---|---|
| 4,326,748 A * | 4/1982 | Brusasco | ............. B60N 2/2252 16/354 |
| 8,480,528 B2 * | 7/2013 | Wilhelm | ................. F16H 25/06 475/162 |

(Continued)

FOREIGN PATENT DOCUMENTS

| | | |
|---|---|---|
| DE | 3930064 A1 | 3/1991 |
| DE | 102007011175 A1 | 9/2008 |

(Continued)

*Primary Examiner* — Adam D Rogers
(74) *Attorney, Agent, or Firm* — Bachman & LaPointe, P.C.

(57) ABSTRACT

Coaxial gear mechanism, with a toothing system which is oriented axially with regard to a rotational axis of the coaxial gear mechanism; a tooth carrier with axially oriented guides; teeth which are received in the guides for engagement with the toothing system, the teeth being oriented with their respective longitudinal axes axially in the guides and being mounted in the guides such that they can be displaced axially; a cam disc which can be rotated about the rotational axis for the axial drive of the teeth; and a housing, in which a setting element for mounting the cam disc is provided, at least one bearing with rolling bodies being arranged between the setting element and the cam disc.

16 Claims, 5 Drawing Sheets

(56) References Cited

U.S. PATENT DOCUMENTS

| | | | | |
|---|---|---|---|---|
| 10,655,722 B2 * | 5/2020 | Dorner | .................... | B23P 15/14 |
| 2021/0131545 A1 * | 5/2021 | Schmidt | ................ | F16H 49/001 |
| 2022/0107002 A1 * | 4/2022 | Schmidt | ................. | F16H 25/06 |
| 2022/0178430 A1 * | 6/2022 | Kimmelmann | ......... | F16H 25/06 |

FOREIGN PATENT DOCUMENTS

| | | | | |
|---|---|---|---|---|
| DE | 102019129662 A1 * | 5/2021 | | |
| JP | 2003042240 A | 2/2003 | | |
| WO | WO-02086351 A2 * | 10/2002 | ............... | F16H 1/28 |
| WO | 2021036148 A1 | 3/2021 | | |

\* cited by examiner

COAXIAL GEAR MECHANISM

BACKGROUND OF THE INVENTION

The invention relates to a coaxial gear mechanism and to the use of a coaxial gear mechanism.

Gear mechanisms are known from the prior art which comprise teeth which are mounted in a tooth carrier such that they can be displaced radially. In order to drive the teeth in a radial direction, drive elements with a profiling, such as for example cam discs, are used. The teeth are moved in a radial direction and engage into a toothing system, with the result that a relative movement occurs between the tooth carrier with the teeth and the toothing system. The relative movement between the toothing system and the teeth is smaller here by at least one order of magnitude than the movement of the drive element with the profiling. In this way, high transmission ratios can be achieved; one example of a gear mechanism of this type is published in DE 10 2007 011 175 A1.

Solutions from the prior art known up to now have restrictions, however, in relation to the transmission of torques, or have a high number of individual parts, or require complicated assembly. Furthermore, the space requirement in the radial direction in the case of hollow shaft gear mechanisms or else in the axial direction is in part too great.

SUMMARY OF THE INVENTION

It is an object of the invention to specify a coaxial gear mechanism which is improved in comparison with coaxial gear mechanisms which are known from the prior art; in particular, a transmission of higher torques or a simplified construction from a lower number of individual parts or simplified assembly or a compact overall design are to be achieved.

The object is achieved by way of a coaxial gear mechanism as disclosed herein and the use as also disclosed herein. Advantageous developments and embodiments result from the subclaims and from this description.

One aspect of the invention relates to a coaxial gear mechanism, with a toothing system which is oriented axially with regard to a rotational axis of the coaxial gear mechanism; a tooth carrier with axially oriented guides; teeth which are received in the guides for engagement with the toothing system, the teeth being oriented axially with their respective longitudinal axes in the guides, and being mounted in the guides such that they can be displaced axially; a cam disc which can be rotated about the rotational axis for the axial drive of the teeth; and a housing, in which a setting element for mounting the cam disc is provided, at least one bearing with rolling bodies being arranged between the setting element and the cam disc.

A further aspect of the invention relates to the use of a typical coaxial gear mechanism which is described herein.

Herein, expressions such as "axial", "radial" or "circumferential direction" are typically to be understood with regard to the rotational axis of the coaxial gear mechanism, for example with regard to the rotational axis of the cam disc of the coaxial gear mechanism.

In typical embodiments, the rolling bodies lie directly on a cam disc bearing face of the cam disc or directly on a setting element bearing face of the setting element. In further embodiments, the rolling bodies lie directly on both of the said faces. In typical embodiments, the setting element is configured as a bearing ring, in particular of a bearing for axial mounting of the cam disc, with a setting element bearing face. The setting element is typically configured such that it can be advanced axially, that is to say its axial position can be changed in relation to the housing in order to set a backlash of the gear mechanism. In the operating state, the setting element is connected fixedly to the housing for conjoint rotation. A further possibility for changing the axial position of the setting element or its bearing plane, on which the rolling bodies lie, can be a replacement of the setting element or a change of a thickness of the setting element.

In typical embodiments, the guides of the tooth carrier are oriented axially with regard to the rotational axis of the coaxial gear mechanism. The teeth are typically mounted in the guides of the tooth carrier such that they can be displaced axially. The teeth are typically mounted in the tooth carrier such that they can be displaced in each case in precisely one direction, typically in the direction of the longitudinal axis of the tooth. This can be achieved, for example, by virtue of the fact that the tooth has a constant cross section in the displacement direction over a defined length, in particular over a defined length along the longitudinal axis of the tooth. The guide for the tooth in the tooth carrier is typically configured as a slot or opening with a cross section which is constant in the axial direction. In particular, the guide is configured as a bore.

Typical tooth carriers comprise guides with in each case one tooth base opening on a tooth base side of the tooth carrier and one tooth tip opening on a tooth tip side of the tooth carrier. The tooth base opening is typically oriented in the direction of the cam disc, and the tooth tip opening is oriented in the direction of the toothing system. This makes it possible to receive the teeth, with the result that the teeth are mounted along their respective longitudinal axis in the guide such that they can be displaced axially with regard to the rotational axis of the coaxial gear mechanism. The longitudinal axis of a tooth typically runs from a tooth base of the tooth to a tooth tip of the tooth. The teeth are typically mounted with their tooth base on bearing segments which are in turn mounted on the cam disc. In typical embodiments, the tooth carrier is circular or annular. Typical guides for the teeth in the tooth carrier are configured as through openings or through bores. Further typical tooth carriers comprise rectangular milled recesses or slots or slits as guides.

In typical embodiments, the coaxial gear mechanism comprises a cam disc with a profiling as drive element for axial drive of the teeth, in particular by way of axial stroke movement of the teeth. The profiling is typically configured along the circumferential direction of the cam disc with at least one elevation in the axial direction, in particular with at least two or at least three elevations. By way of the rotational drive of the cam disc with the profiling, a force can be exerted on the teeth via the bearing segments in the direction of the respective longitudinal axis of the teeth, with the result that the said teeth are pressed in the axial direction out of the guides on the tooth tip side of the tooth carrier.

Typical coaxial gear mechanisms comprise an axially oriented toothing system. In particular, the toothing system can be configured as a toothing system of a face gear which can be formed integrally with the housing or can be formed as part of the housing.

Typical coaxial gear mechanisms have a drive shaft and an output shaft. In embodiments, the drive shaft can be configured integrally with the cam disc. In further embodiments, the output shaft can be configured integrally with the tooth carrier.

The drive shaft and the output shaft are typically mounted such that they can be rotated about the rotational axis of the coaxial gear mechanism. The drive shaft or the output shaft or both is/are typically configured as hollow shafts. The cam disc is typically provided on the drive shaft. In typical embodiments, the drive shaft and the cam disc can be integral or configured with two parts or multiple parts. In typical embodiments, the tooth carrier is provided on the output shaft, the toothing system being connected, in particular, fixedly to a housing of the coaxial gear mechanism so as to rotate with it, or not being capable of rotating relative to the housing.

In typical embodiments of the coaxial gear mechanism according to the invention, at least part of the teeth are of flexurally rigid configuration. Here, the term "flexurally rigid" is typically to be understood technically, that is to say bends of the teeth on account of the rigidity of the material of the teeth are so small that they are at least substantially insignificant for the kinematics of the coaxial gear mechanism. Flexurally rigid teeth comprise, in particular, teeth which are produced from a metal alloy, in particular steel or a titanium alloy, a nickel alloy or other alloys. Furthermore, flexibly rigid teeth made from plastic can also be provided, in particular in the case of coaxial gear mechanisms, in the case of which at least one of the following parts is also likewise produced from plastic: toothing system, tooth carrier and drive element. In typical embodiments, the tooth carrier and the teeth are produced from a metal alloy, or additionally the toothing system or further additionally the drive element is produced from a metal alloy. Coaxial gear mechanisms of this type afford the advantage that they are extremely torsionally stiff and highly durable. Coaxial gear mechanisms made from plastic afford the advantage that they have a low weight. The expression "flexurally rigid" means, in particular, a flexural rigidity about a transverse axis of the tooth. This means, in particular, that, in the case of a view of the tooth as a bar from a tooth base to tooth tip, there is flexural rigidity which at least substantially prevents bending deformations between the tooth tip and the tooth base. An extremely high load-bearing capability and torsional stiffness of the coaxial gear mechanism are achieved by way of the flexural rigidity.

The toothing system and the teeth typically have curved flanks. Examples for curvatures of the flanks are a cylindrical curvature, a curvature of the flanks along a helix or a coil face about the rotational axis of the coaxial gear mechanism, or a curvature in the form of a logarithmic spiral. Reference is made to DE 10 2007 011 175 A1 for one possible embodiment of a curvature in the form of a logarithmic spiral. The curved surface affords the advantage that the flanks which are in engagement bear in a flat manner and not merely in a linear or punctiform manner. In this way, an extreme rigidity is achieved in the case of the transmission of force between the toothing system and the teeth. Herein, "flanks" are to be understood to mean, in particular, tooth flanks of the teeth or flanks of the toothing system.

In typical embodiments, a tooth has a tooth tip with tooth flanks in a first end region of the tooth, which first end region faces the toothing system. The tooth typically comprises a tooth base in a second end region of the tooth which faces the cam disc. The tooth base typically has a tooth base protuberance. The tooth base protuberance is typically configured to mount the tooth in a tooth inlet of a bearing segment.

In typical embodiments, the tooth comprises a tooth rump between the tooth tip and the tooth base. The tooth rump extends along the longitudinal axis of the tooth over a rump length. The tooth rump typically has at least substantially a constant cross section over the rump length, apart from lubricating channels or the like.

In typical embodiments, the tooth is configured as a round tooth. For example, the tooth rump of a tooth has an at least substantially constant circular cross section. The tooth rump is typically of at least substantially cylindrical configuration.

In further typical embodiments, a tooth is configured as a flat tooth. Flat teeth are typically guided in guides with a non-round cross section in the tooth carrier. In typical embodiments, the tooth has an at least twice as great width, for example in the radial direction of the coaxial gear mechanism, as thickness, for example in the circulating direction of the coaxial gear mechanism. Further embodiments comprise round, circular or oval teeth or round teeth with flattened portions.

In typical embodiments, a plurality of bearing segments are arranged between the cam disc and the teeth. The bearing segments are typically configured for mounting of the teeth on the cam disc. In typical embodiments, the bearing segments are arranged in an annular manner. The bearing segments are typically arranged adjacently with respect to one another in the circumferential direction.

Each of the teeth of the coaxial gear mechanism is typically mounted in each case on one of the bearing segments. In further typical embodiments, in each case at least one tooth is mounted on one of the bearing segments and, in particular, in each case at least two teeth or in each case at least three teeth.

In typical embodiments, at least two of the bearing segments are connected to one another, in particular are connected integrally to one another. For example, at least two of the bearing segments are produced in one piece. In particular, at least three, at least four or all the bearing segments of the coaxial gear mechanism are connected to one another or are produced in one piece. Bearing segments which are connected to one another are typically connected to one another elastically, for example by way of a solid body joint, in particular in a bendable manner in order to follow a stroke movement of the cam disc in the axial direction.

In typical embodiments, a solid body joint which connects two bearing segments to one another is set up as a predetermined break point. For example, after the assembly of the coaxial gear mechanism, contiguity of the bearing segments can no longer be necessary. In particular, after the fracture of the solid body joint at the predetermined break point, the bearing segments can be connected to one another via a loose joint, in particular in a positively locking manner.

In typical embodiments, bearing segments are connected to one another in an articulated manner, in particular in a fixed or loose manner. The bearing segments are typically connected to one another such that they are fixed and, in particular, cannot be released from one another. The bearing segments can typically be moved with respect to one another and are configured, in particular, to follow a stroke movement of the cam disc in an axial direction. In further typical coaxial gear mechanisms, the bearing segments are configured as individual, loose bearing segments.

In typical embodiments, the bearing segments in each case have a tooth inlet for receiving a respective tooth which is mounted on the bearing segment. The bearing segments typically in each case have a tooth inlet. The tooth inlet typically has a depression in the axial direction. A tooth of the coaxial gear mechanism can be received in the depression. For example, the tooth inlet can be configured as a shell which is open on one side. The edge of the tooth inlet is typically of rectangular or oval configuration. As a result, for example, a pivoting movement of the bearing segment with respect to the tooth can be made possible.

The bearing segments typically comprise webs, the webs in each case connecting a first one of the bearing segments to an adjacent one of the bearing segments. In particular, a web can be arranged on that side of the bearing segments which faces the tooth carrier, or can be arranged centrally with regard to the axial width of the bearing segments. The web typically has an axial thickness which is smaller than the axial width of a bearing segment. The web is typically of tapered configuration with respect to the bearing segment. The web of a bearing segment is typically configured as a solid body joint. In particular, the web has a smaller flexural rigidity than a tooth inlet of the bearing segment. In particular, the web is configured to provide a movement capability of the bearing segments relative to one another, in particular a movement capability in the axial direction.

The teeth are typically connected to the bearing segments in each case via a latching mechanism, in particular in a manner which is secured against falling out of the bearing segments. A tooth and a bearing segment are typically connected to one another such that they can move. For example, the tooth and the bearing segment can be connected to one another by way of positively locking connection or an undercut or a clip. Bearing segments and teeth which are connected to one another can, in particular, facilitate or simplify the assembly of a typical coaxial gear mechanism.

In typical embodiments, the teeth in each case have at least one notch, in particular at least two notches. The bearing segments typically in each case comprise at least one clip which is configured for positively locking connection or for non-positive connection to the tooth, in particular to the at least one notch of the tooth. The at least one notch of the tooth is typically configured in a tooth base region of the tooth. The tooth base region of the tooth typically projects out of a guide of the tooth carrier.

In typical embodiments, a tooth inlet of a bearing segment is rounded on the inside with a first pivoting radius, in particular in the circumferential direction. In typical embodiments, a tooth of the coaxial gear mechanism has a tooth base protuberance on the tooth base of the tooth, in particular a tooth base protuberance with a second pivoting radius. In particular, the tooth base protuberance can be configured in a semi-cylindrical shape with the second pivoting radius, a cylinder axis of the semi-cylindrical shape being oriented, for example, in a radial direction with regard to the rotational axis of the coaxial gear mechanism. The second pivoting radius is typically at least substantially identical to the first pivoting radius. The tooth typically lies with the tooth base protuberance in the tooth inlet. As a result, for example, a pivoting movement of the bearing segment with respect to the tooth can be made possible, in particular about a radial direction with regard to the rotational axis of the coaxial gear mechanism.

The bearing segments typically have a plain bearing face for sliding mounting of the bearing segments on the cam disc. In particular, the bearing segments in each case have a plain bearing face. In typical embodiments, the bearing segments have at least one lubricating groove on that side of the bearing segments which faces the cam disc. The lubricating groove is typically configured at the boundary between two adjacent bearing segments. In particular, the lubricating groove can be delimited spatially by way of two adjoining bearing segments and a web. The lubricating groove typically extends in the radial direction between two bearing segments. The lubricating groove can facilitate, for example, the introduction of a lubricant into a lubricating gap between the plain bearing face of a bearing segment and a profiling sliding face of the profiling. A lubricant exchange between the lubricating gap and a gear mechanism interior of the coaxial gear mechanism can be improved, for example, via the lubricating groove. In particular, the lubricating groove and, in particular, the plain bearing face can be optimized for a hydrodynamic plain bearing function.

A bearing segment typically comprises a plain bearing face and a groove face on that side of the bearing segment which faces the cam disc. The profiling of the cam disc typically has a profiling sliding face which faces the bearing segments and on which the bearing segments lie with the respective plain bearing face. The plain bearing face is typically oriented at least substantially parallel to the profiling sliding face of the profiling. The groove face is typically inclined in the axial direction with respect to the profiling sliding face. In particular, a bearing segment comprises two groove faces, for example in each case one groove face on both sides of the plain bearing face in the circumferential direction. In particular, two groove faces flank one lubricating groove. The transition between the plain bearing face and the groove face is typically rounded in the circumferential direction, for example is rounded with a radius.

In typical embodiments, the bearing segments are produced from plastic or from metal. The bearing segments are typically produced by way of a primary forming method or a reshaping method. In typical embodiments, the bearing segments are produced in a primary forming method from plastic in a plastic injection moulding method, in a continuous casting method or high pressure die casting method or by way of metal powder injection moulding (MIM). In further typical embodiments, the bearing segments are produced from metal in a deep-drawing method. The bearing segments are typically produced from steel, bronze or aluminium, in particular with coatings.

In typical embodiments, the parts of the coaxial gear mechanism are produced from plastic, metal or a plastic/metal composite. The parts of the coaxial gear mechanism, in particular the toothing system, the tooth carrier, the bearing segments, the teeth or the cam disc, are typically produced by way of a primary forming method or a reshaping method. In exemplary embodiments of a coaxial gear mechanism, the parts of the coaxial gear mechanism, apart from the teeth and the cam disc, can be produced from plastic or a plastic/metal composite, the teeth and the cam disc being produced from metal. In further exemplary embodiments, the parts of a coaxial gear mechanism, apart from the bearing segments, can be produced from steel, the bearing segments being produced from plastic.

In typical embodiments, the bearing segments in each case have an at least substantially constant wall thickness. In particular, the tooth inlets or the webs, in particular the tooth inlets and the webs, can have an at least substantially constant wall thickness. For example, bearing segments with an at least substantially constant wall thickness can be particularly suitable for production in an injection moulding method or deep-drawing method.

With typical coaxial gear mechanism the setting element can be adjusted axially by a displacement nut, wherein the displacement nut is in a screwing engagement with the housing. Typically, the setting element is axially supported by an abutment bearing pot, the abutment bearing pot being axially supported by the displacement nut.

Advantages of typical embodiments can be a large hollow shaft opening, the capability for the transmission of high torques, and a great rigidity, for example by way of direct transmissions of force in the coaxial gear mechanism, a small overall length and the possibility of setting a zero play, for example by setting of the setting element. This results generally in the possibility of setting the play in typical embodiments. A further advantage of embodiments can be simple assembly.

BRIEF DESCRIPTIONS OF THE DRAWINGS

In the following text, the invention will be described in greater detail on the basis of the appended drawings, in which:

FIG. 4 shows a diagrammatic sectional view of a plurality of bearing segments, FIGS. 5A-C in each case show a diagrammatic view of a tooth of a typical embodiment, FIG. 6 diagrammatically shows a further embodiment of a coaxial gear mechanism, FIG. 7 diagrammatically shows a further embodiment of a coaxial gear mechanism and FIG. 8 diagrammatically shows a part of a further embodiment of a coaxial gear mechanism.

DETAILED DESCRIPTION

In the following text, typical embodiments of the invention will be described on the basis of the figures, the invention not being restricted to the exemplary embodiments, but rather the scope of the invention being defined by way of the claims. In the description of the embodiments, the same reference signs are used in some circumstances for identical or similar parts in different figures and different embodiments. Features which have already been described in conjunction with different figures are in part not described again for the sake of clarity. For the sake of clarity, not all the respective features are partially provided with a reference sign, for example the bearing segments (reference sign 17 in FIGS. 1-4).

Figure 1:
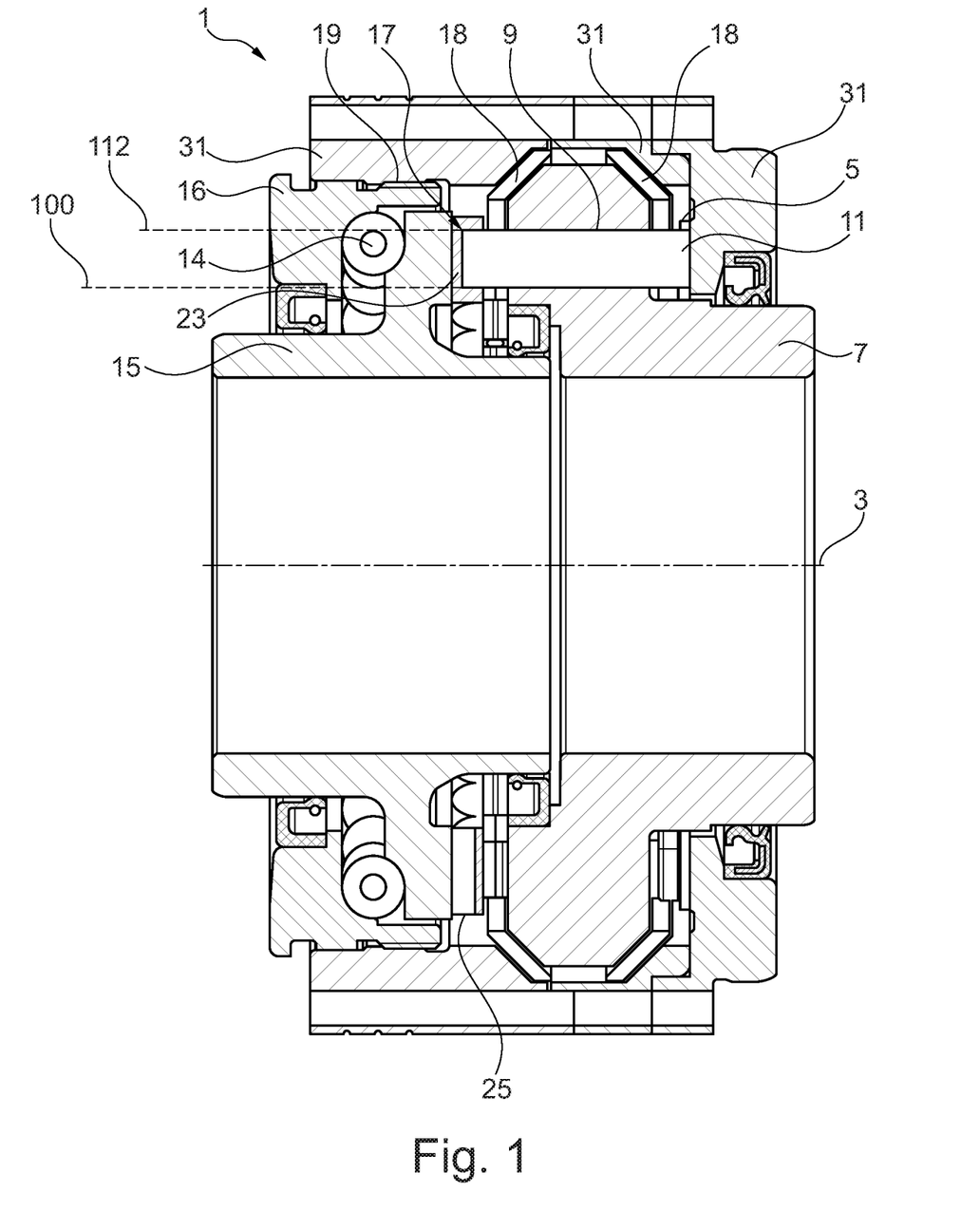
FIG. 1 shows a typical embodiment of the coaxial gear mechanism in a diagrammatic sectional view.

FIG. 1 shows a detail of a typical embodiment of the invention in a diagrammatic sectional view. FIG. 1 shows a coaxial gear mechanism 1 with a toothing system 5 which is oriented with regard to a rotational axis 3 of the coaxial gear mechanism 1. The toothing system 5 is configured integrally in one of the parts of the housing 31 so as to circulate about the rotational axis 3. The three parts of the housing 31 are connected to one another fixedly for conjoint rotation.

The coaxial gear mechanism 1 comprises a tooth carrier 7 which is provided integrally with an output shaft, that is to say the output shaft and the tooth carrier 7 are configured as one component.

The tooth carrier 7 is mounted in the housing 31 via an output bearing such that it can be rotated about the rotational axis 3. In the embodiment of FIG. 1, the output bearing is configured as an angular contact roller bearing 18, the rollers of the angular contact roller bearing 18 rolling on one side directly on the surface of the tooth carrier and on the other side directly in each case on a part of the housing 31. Here, a first part of the angular contact rollers rolls on a first part of the housing 31, and a second part of the angular contact rollers of the angular contact roller bearing 18 rolls on a second part of the housing. During assembly, the first and the second part of the housing 31 are connected to one another, with the result that the angular contact rollers can be inserted beforehand. The face gear with the internal toothing system 5 forms a third part of the housing 31. The third part of the housing 31 is connected to the second part of the housing fixedly for conjoint rotation, like the first part.

The tooth carrier has axially oriented guides 9, in which teeth 11 are received in each case. The teeth 11 are mounted along their respective longitudinal axes in the guides 9 such that they can be displaced axially with regard to the rotational axis 3.

A cam disc 15 which is configured integrally with the drive shaft is mounted via a bearing on a setting element 16 such that it can be rotated about the rotational axis 3. The setting element 16 is configured as a setting nut, and is fastened in the first part of the housing 31 in an axially adjustable manner by means of a thread 19. The bearing of the cam disc 15 opposite the setting element 16 can also be called a drive bearing, and is configured as an angular contact ball bearing, the rolling bodies 14 of which are accordingly balls. An axial play can be minimized by way of the setting element 16 in conjunction with the angular contact ball bearing. The drive bearing is configured to absorb axial forces.

In embodiments, a contact angle which runs obliquely with respect to the rotational axis is built up by way of the configuration of the drive bearing as an angular contact ball bearing with an asymmetrical bearing cross section, with the result that favourable and stabilizing prestressing of the gear mechanism can be achieved. At the same time, axial and radial forces can be absorbed.

In typical embodiments, the toothing system can be connected fixedly to a part of the housing or it can be configured integrally with the housing. A setting element is typically received in the housing such that it can be adjusted axially. One possibility is, for example, a thread in the housing, by way of which thread the axial position of the setting element which is configured as a setting nut can be changed. Typically, the setting element can also additionally be secured axially, for example adhesively bonded. In other embodiments, clamping mechanisms can be provided for axially variable fixing of the setting element in the housing.

The rolling bodies 14 lie on one side directly on surfaces of the setting element 16 which is configured in one piece. The cam disc 15 likewise has a surface for contact with the rolling bodies 14, with the result that the rolling bodies also lie directly on the combination configured in one piece of the cam disc and the drive shaft.

Typical embodiments comprise, in particular, immediate or direct mounting of the cam disc on the setting element. This typically means that no bearing shells are provided for the rolling bodies. In this way, a compact overall design can be achieved. This applies analogously to the output bearing and to the tooth carrier which is typically mounted in the housing without bearing shells.

Typical embodiments have merely precisely one bearing between the housing on one side and the cam disc with the drive shaft on the other side. The background is that the cam disc is also stabilized by way of the contact with the bearing segments. Furthermore, typical embodiments comprise precisely one output bearing, in particular one angular contact roller bearing which typically comprises two circulating rows of angular contact rollers, or a cross-rolling bearing, in particular with precisely one circulating row of rolling bodies which are arranged at a right angle with respect to one another in a manner which alternates in the circulating direction.

In typical embodiments, as also, for example, in the exemplary embodiment which is shown in FIG. 1, the internal diameter of the cam disc, and of the drive shaft which is optionally configured integrally with the cam disc, corresponds at least substantially to the internal diameter of the tooth carrier and the output shaft which can likewise be configured integrally with the tooth carrier. Here, "at least substantially" typically means that the internal diameters differ by less than 10% or by less than 5% or by less than 2%. In this way, leadthroughs with an at least substantially constant cross section in the axial direction through the gear mechanism are possible.

As viewed in the axial direction, the contact region between the rolling bodies 14 and the cam disc 15 intersects at least partially with the radial region of the teeth 11 between an inner radius 100 of the teeth 11 (illustrated only in the upper image half of FIG. 1) and an outer radius 112 of the teeth (illustrated only in the upper image half of FIG. 1).

In typical embodiments, the contact region between the rolling bodies and the cam disc is situated radially between an inner radius and an outer radius of the teeth or of the guides which are arranged in the tooth carrier. In this way, favourable axial forwarding of forces is achieved.

In typical embodiments, the tooth carrier is mounted in the housing by means of an output bearing, the output rolling bodies of which are arranged radially outside the teeth. Here, "radially outside" typically means that the rolling bodies are arranged completely outside an outer radius of the teeth. The output rolling bodies are typically arranged in an axial region of the teeth or in an axial region of the guides. In this way, a compact overall design is achieved. Here, the axial region of the guides denotes, for example, that region along the axle of the gear mechanism which is situated axially between the two openings of the guides in the tooth carrier.

In the exemplary embodiment of FIG. 1, the obliquely arranged rollers of the angular contact roller bearing 18 which form the output rolling bodies are arranged completely radially outside the outer radius 112 of the teeth 11 or the guides 9. Furthermore, the obliquely arranged rollers are arranged in the axial direction completely between the two openings of the guides 9. Here, "axially in between" means, for example, that the output rolling bodies, that is to say the oblique rollers in the exemplary embodiment of FIG. 1, are arranged between a plane which lies perpendicularly at the level of the one end of the guides 9 and on the rotational axis 3, and a plane which lies perpendicularly at the level of the other end of the guides 9 and on the rotational axis 3.

The teeth 11 in each case comprise a tooth tip which is oriented for engagement with the toothing system 5, and a tooth base which projects out of the guide 9 of the respective tooth 11 and is mounted on a bearing segment 17. Furthermore, a tooth 11 comprises a tooth rump between the tooth base and the tooth tip, the tooth rump being received at least partially in the guide 9 of the tooth 11. The tooth base of the tooth 11 lies in a tooth inlet 19 of the bearing segment 17. The bearing segment 17 and the tooth 11 are connected to one another via a latching mechanism. In FIG. 1, the latching mechanism is provided by way of a clip 27 of the bearing segment 17 and two notches (see FIGS. 5A-C) of the tooth 11.

Figure 2:
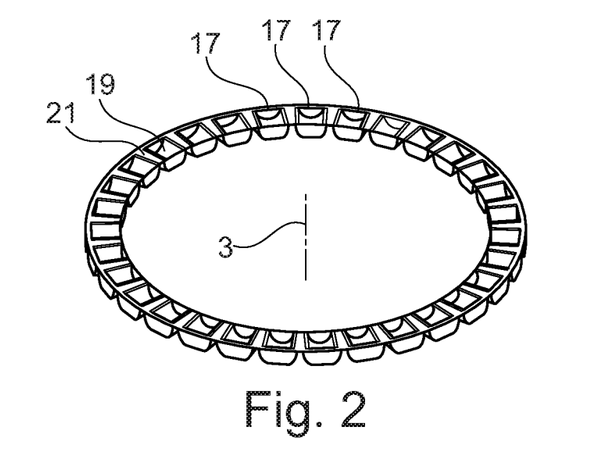
FIG. 2 shows a diagrammatic view of a plurality of bearing segments of the typical coaxial gear mechanism.
Figure 3:
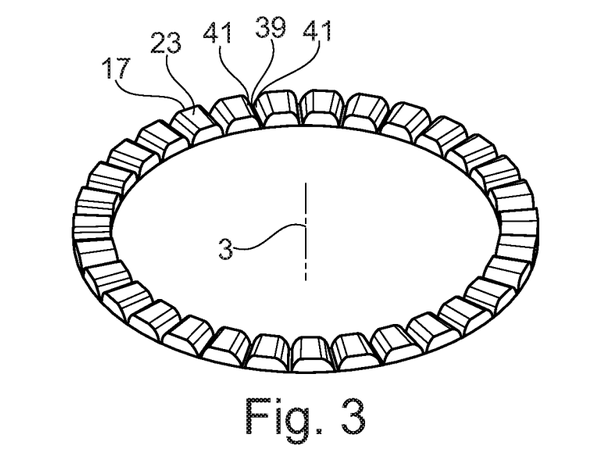
FIG. 3 shows a further diagrammatic view of a plurality of bearing segments.
Figure 4:
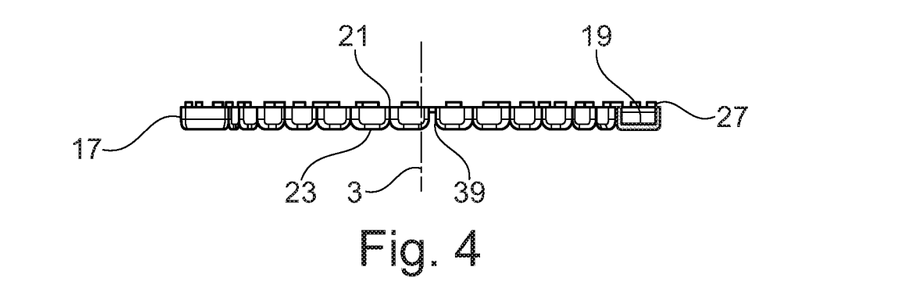

The bearing segments are shown in greater detail in FIGS. 2 to 4. Each bearing segment 17 of the plurality of bearing segments 17 has a tooth inlet 19 which is configured as a depression in the axial direction. The tooth inlets 19 are rounded with a first pivoting radius in each case in the circumferential direction. In each case two bearing segments 17 are connected to one another by way of a web 21 of the bearing segments 17. In particular, the web 21 in each case connects a tooth inlet 19 of a first one of the bearing segments 17 to the tooth inlet 19 of an adjacent one of the bearing segments 17.

The bearing segments 17 are mounted in each case via a plain bearing face 23 on a profiling 25 of a cam disc 15 of the coaxial gear mechanism 1. The cam disc 15 is configured integrally with a drive shaft. The profiling 25 is configured so as to run around the rotational axis 3 and, in the embodiment of FIG. 1, has two axial elevations in the direction of the teeth 11. The bearing faces, in particular the plain bearing faces 23 and a profiling sliding face of the profiling 25, are lubricated with a lubricant. The plain bearing face 23 of a bearing segment 17 is provided on that side of the tooth inlet 19 of the bearing segment 17 which faces the profiling 25.

The bearing segments 17 have a lubricating groove 39 between the plain bearing faces 23 of two adjacent bearing segments 17. The lubricating groove 39 between the plain bearing faces 23 of two adjacent bearing segments 17 is bridged by way of a web 21 between two adjacent bearing segments 17. By way of the lubricating groove 39, for example, the introduction of lubricant into a lubricating gap between the plain bearing face 23 and a profiling sliding face of the profiling 25 can be improved.

FIGS. 2 and 3 show views of a plurality of bearing segments 17 of a typical coaxial gear mechanism. The bearing segments 17 are connected to one another in an annular manner. In particular, the bearing segments 17 are arranged along a ring which is concentric with respect to the rotational axis 3 of the coaxial gear mechanism 1. FIG. 2 shows a view of that side of the bearing segments 17 which faces the teeth of the coaxial gear mechanism. The bearing segment 17 in each case comprise a tooth inlet 19 and a web 21. The tooth inlet 19 is configured in the form of a shell which is open in the direction of the teeth of the coaxial gear mechanism and is configured to receive the teeth. The tooth inlets 19 are rounded with a first pivoting radius in each case in the circumferential direction. The tooth inlets 19 and the webs 21 have an at least substantially constant wall thickness.

FIG. 3 shows a view of that side of the bearing segments 17 which faces the profiling of the cam disc. The tooth inlets 19 of the bearing segments 17 have a plain bearing face 23 in each case on the side which faces the profiling. The plain bearing faces 23 typically lie on a profiling sliding face of the profiling. The plain bearing faces 23 are oriented at least substantially parallel to the profiling sliding face of the profiling in each case locally, that is to say at that point of the profiling sliding face, on which a plain bearing face 23 lies on the profiling sliding face of the profiling. The two bearing segments 17 have a lubricating groove 39 between the plain bearing faces 23 of two adjacent bearing segments 17. The lubricating groove 39 extends in the radial direction along the bearing segments 17. A plain bearing face 23 is flanked by two groove faces 41, the groove faces 41 being rounded or inclined with respect to the profiling sliding face of the profiling. In FIG. 3, the lubricating groove 39 is delimited axially in the direction of the teeth by way of the web 21.

FIG. 4 shows a sectional view of an annularly arranged plurality of bearing segments 17. The bearing segments 17 in each case comprise a tooth inlet 19 and a clip 27. The clip 27 is of elastic configuration, with the result that the clip 27 can be deformed elastically during the plugging of a tooth into the tooth inlet. The clip 27 is configured to engage into notches (FIGS. 5A-C) of a tooth which is plugged into the tooth inlet 19, and to latch in the notches.

Figure 5A:
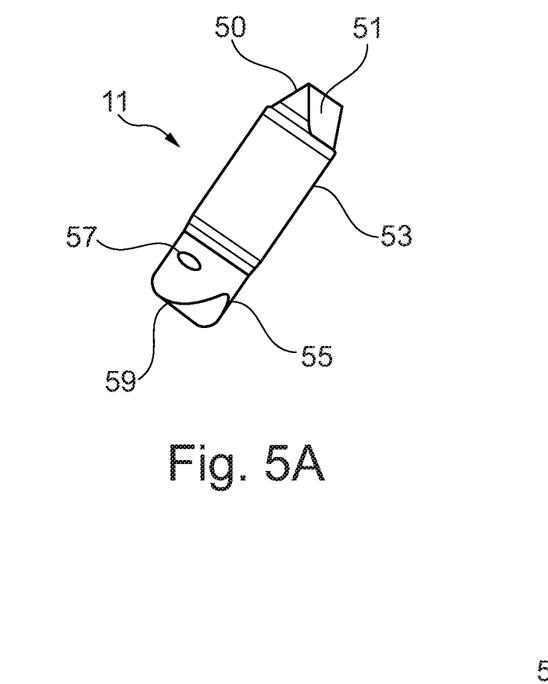
Figure 5B:
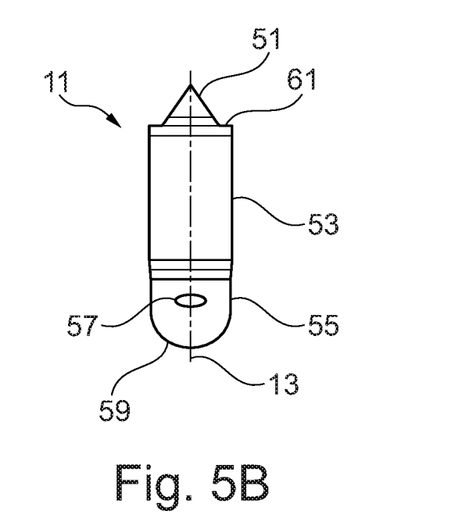
Figure 5C:
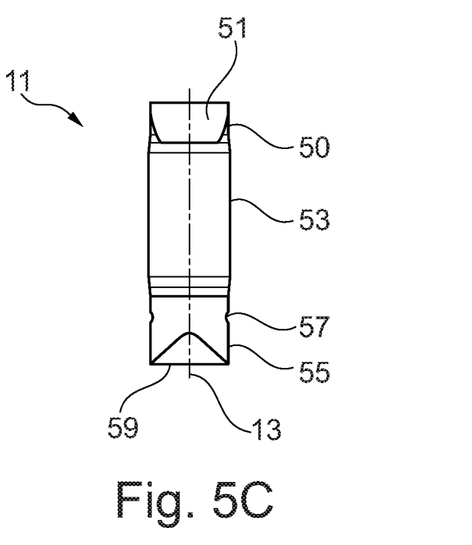

FIGS. 5A to 5C show diagrammatic views of a tooth 11 of a typical coaxial gear mechanism in one exemplary embodiment, and will be described jointly in the following text. Here, FIG. 5B shows a side view of the tooth profile of the tooth 11, and FIG. 5C shows a side view perpendicularly with respect to the viewing plane of FIG. 5B. The tooth 11 comprises a tooth tip 50 with tooth flanks 51 which are configured for engagement with a toothing system of the coaxial gear mechanism.

The tooth 11 comprises a tooth rump 53 which is provided for being received into a guide of a tooth carrier. The tooth rump 53 has an at least substantially constant diameter in cross section with respect to the longitudinal axis 13 of the tooth 11, and a circular cross section. At the transition between the tooth tip 50 and the tooth rump 53, the exemplary embodiment of FIGS. 5A-C has a shoulder 61 which is set back inwards from the tooth rump 53 in the direction of the longitudinal axis 13.

At least one part of a tooth base 55 of the tooth 11 typically projects out of the guide of the tooth carrier. The tooth base 55 of the tooth 11 comprises two notches 57 in FIGS. 5A-C. The notches 57 are configured to connect the tooth 11 via a latching mechanism to a bearing segment of the coaxial gear mechanism, in particular via a positively locking or non-positive connection to a clip of the bearing segment. The tooth base 55 has a tooth base protuberance 59. In FIGS. 5A-C, the tooth base protuberance 59 is configured as a semicylindrical protuberance in the direction of the longitudinal axis 13. The tooth base protuberance 59 is configured with a second pivoting radius. The tooth base protuberance 59 is configured to be received in a tooth inlet of a bearing segment, the tooth inlet being rounded with a first pivoting radius which corresponds at least substantially to the second pivoting radius of the tooth base protuberance 59.

The tooth base 55 is of tapered configuration with respect to the tooth rump 53. The transition region between the tooth base 55 and the tooth rump 53 is inclined slightly with respect to a longitudinal axis 13 of the tooth 11. The edges between the tooth base 55 and the tooth rump 53 are rounded. The tooth 11 therefore bears only in the region of the tooth rump 53 in a guide of the tooth carrier. For example, lubricant can be pulled into the guide by way of the tapering of the tooth 11 from the tooth rump 53 to the tooth base 55, and the tooth can therefore be lubricated with respect to the guide.

Figure 6:
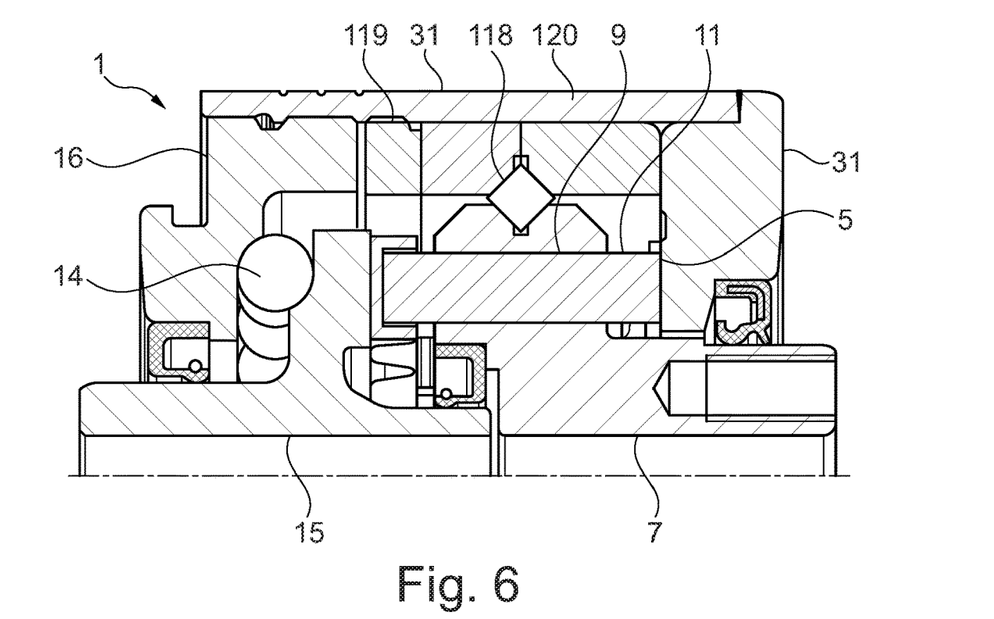

FIG. 6 diagrammatically shows in a partial section a further embodiment of a coaxial gear mechanism 1. The coaxial gear mechanism 1 of FIG. 6 has a cross-rolling bearing 118 which mounts the tooth carrier 7 which is configured integrally with the output shaft. The cross-rolling bearing 118 is braced via a separate shaft nut 119 against an abutment block 120 within the housing. The shaft nut 119 is received in a part of the housing 31 with a thread for axial adjustment. In the embodiment of FIG. 6, the housing 31 comprises merely two parts, one of the parts comprising the face gear with the toothing system 5, and also serving as a support for the abutment block 120. The other part of the housing 31 is connected in a fixed manner to the first part, and receives the shaft nut and the setting element. No bearing shells are arranged between the tooth carrier 7 and the rolling bearings of the cross-rolling bearing 118. Otherwise, the embodiment of FIG. 6 corresponds in numerous parts to the embodiment of FIG. 1.

Figure 7:
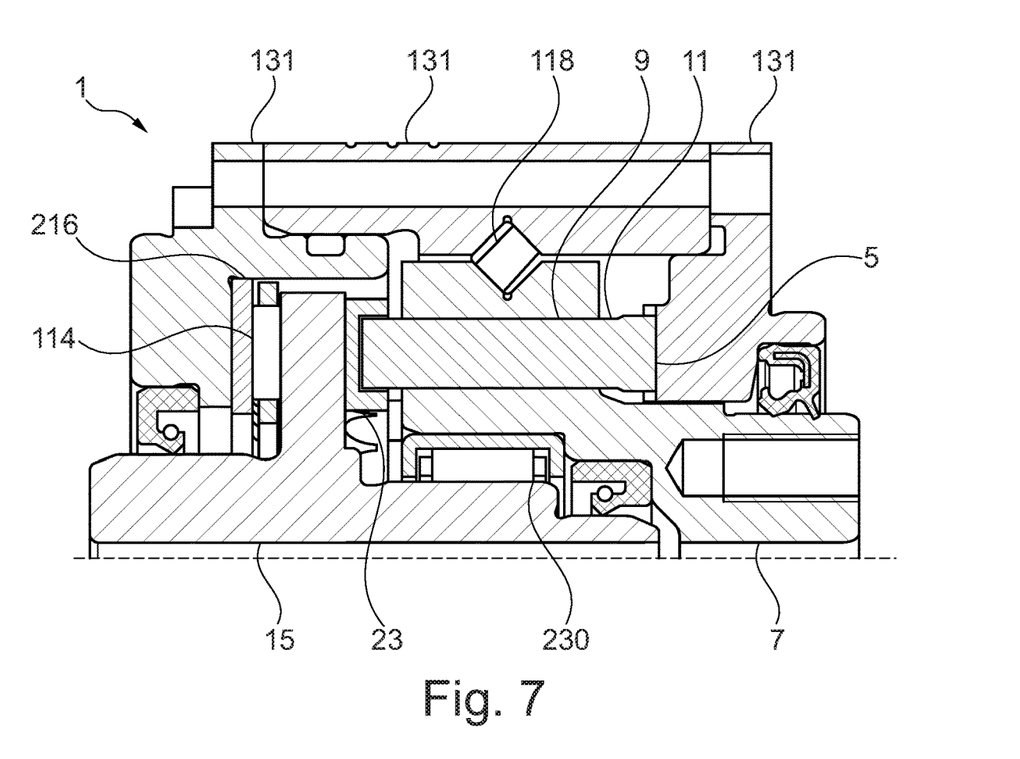

FIG. 7 diagrammatically shows a partial section of a further embodiment of a coaxial gear mechanism 1. The coaxial gear mechanism 1 of FIG. 7 has a cross-rolling bearing 118 which mounts the tooth carrier 7 which is configured integrally with the output shaft. In the embodiment of FIG. 7, the housing 131 comprises three parts, one of the parts comprising the face gear with the toothing system 5. The middle part of the housing 131 receives the cross-rolling bearing 18, and is connected in a fixed manner to the first part. The third part (on the left in the image) of the housing 131 serves as an abutment for the setting element 216 which is in turn configured as a ring. The setting element can be replaced or can have its axial thickness changed, in order to set a play of the coaxial gear mechanism 1. Needle rollers 114 as rolling bodies of an axial needle roller bearing roll directly on the setting element 16. The needle rollers as rolling bodies 114 of the coaxial gear mechanism 1 support the cam disc in an axially flush manner with the teeth 11. The needle rollers run directly on a surface of the cam disc 15.

In embodiments, a drawn cup needle roller bearing 230 can be provided as radial roller bearing, in order to bear the cam disc 15 in the radial direction. This mounting can take place either, as shown in FIG. 7, in the tooth carrier 7 or optionally also directly in the housing 131.

Figure 8:
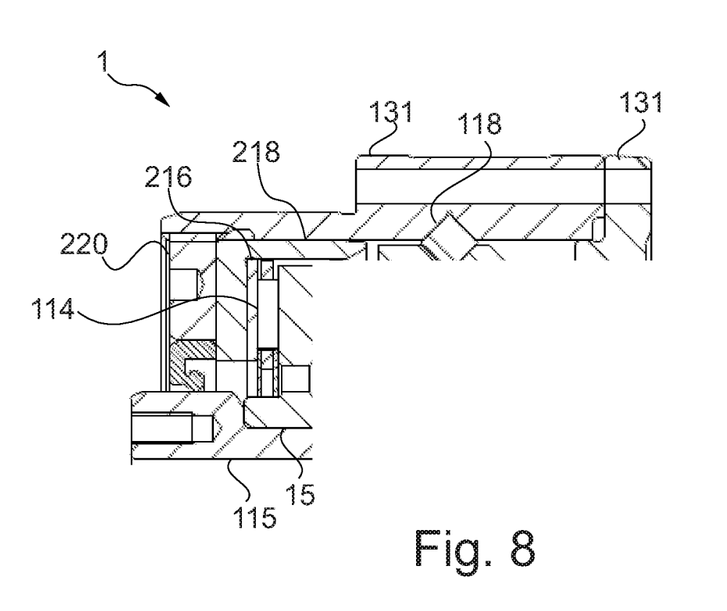

FIG. 8 schematically shows a partly sectional view of a further embodiment of a coaxial gearing 1. Parts of the view, which are identical to the embodiment of FIG. 7 are omitted for a better viewabilty.

The coaxial gearing 1 of FIG. 8 comprises a setting element 216 being axially beared by an abutment bearing pot 218. The abutment bearing pot 218 comprises a central opening for a reach through of a driving shaft 115 on which the cam disc 15 is fixedly mounted. Hence, in contradiction to the embodiment of FIG. 7, cam disc 15 and driving shaft 115 of FIG. 8 are realized as two parts.

With its outer circumference, the abutment bearing pot 218 is sliding within the cylindrical housing 131. The setting element 216 is formed as a ring and rests on an inner part of the abutment bearing pot 218. The setting element 216 is used to bear the rolling bodies 114 on which in turn the cam disc is beared upon.

The abutment bearing pot 218 is resting or beared by a displacement nut 220, wherein the displacement nut 220 is in a screwing engagement with the housing 131. By doing so, the axial position of the displacement nut 220 can be adjusted. By adjusting the displacement nut 220, the abutment bearing pot 218 and the setting element 216 are axially adjusted as well. This allows for a flexible adjustment of the axial position of the respective parts of the coaxial gearing without a need to replace any of these parts by thicker or thinner parts.

In one alternative refinement, the rolling bodies can also run directly on running faces of the housing. In the case of a single-piece configuration of the housing in the region of the running faces, filling can take place via a filling opening in the housing. This has the advantage that there is a defined prestress of the rolling bodies and the number of components can be reduced.

The invention claimed is:
1. A coaxial gear mechanism, comprising:
   a toothing system which is oriented axially with regard to a rotational axis of the coaxial gear mechanism;
   a tooth carrier with axially oriented guides;

teeth which are received in the guides for engagement with the toothing system, the teeth being oriented with their respective longitudinal axes axially in the guides and being mounted in the guides such that the teeth can be displaced axially;

a cam disc which can be rotated about the rotational axis for axial drive of the teeth; and a housing, in which a setting element for mounting the cam disc is provided, at least one bearing with rolling bodies being arranged between the setting element and the cam disc.

2. The coaxial gear mechanism according to claim 1, the setting element being received in the housing such that the setting element can be adjusted axially and/or the setting element can be replaced and/or such thickness of the setting element can be adjusted.

3. The coaxial gear mechanism according to claim 2, wherein the setting element can be adjusted in order to set a backlash.

4. The coaxial gear mechanism according to claim 1, the rolling bodies resting on one side directly on a cam disc bearing face of the cam disc and/or on the other side directly on a setting element bearing face of the setting element.

5. The coaxial gear mechanism according to claim 4, a contact region between the rolling bodies and the cam disc intersecting, as viewed in the axial direction, at least partially with a radial region of the teeth.

6. The coaxial gear mechanism according to claim 1, the tooth carrier being mounted in the housing by means of an output bearing having output rolling bodies, wherein the output rolling bodies are arranged radially outside the teeth.

7. The coaxial gear mechanism according to claim 6, the output rolling bodies being arranged in an axial region with the teeth.

8. The coaxial gear mechanism according to claim 6, the output bearing being configured as a cross-rolling bearing or as an angular contact roller bearing.

9. The coaxial gear mechanism according to claim 1, an internal diameter of the cam disc corresponding at least substantially to an internal diameter of the tooth carrier.

10. The coaxial gear mechanism according to claim 1, a plurality of bearing segments for mounting the teeth being arranged between the cam disc and the teeth.

11. The coaxial gear mechanism according to claim 10, the bearing segments having a plain bearing face for sliding mounting of the bearing segments on the cam disc.

12. The coaxial gear mechanism according to claim 1, the setting element being configured as a ring.

13. The coaxial gear mechanism according to claim 1, wherein the setting element has an axial abutment with the housing.

14. The coaxial gear mechanism according to claim 1, the setting element being adjusted axially by a displacement nut, wherein the displacement nut is in a screwing engagement with the housing.

15. The coaxial gear mechanism according to claim 14, wherein the setting element is axially supported by an abutment bearing pot, the abutment bearing pot being axially supported by the displacement nut.

16. Use of the coaxial gear mechanism according to claim 1, axial setting of the cam disc taking place by way of change of axial position of the setting element and/or by way of a replacement and/or a change of thickness of the setting element.

* * * * *